US009463850B2

(12) United States Patent
Lovett (10) Patent No.: US 9,463,850 B2
(45) Date of Patent: Oct. 11, 2016

(54) FLOATING MOUNTING BASE FOR AN UMBRELLA

(71) Applicant: Jeffrey Lovett, Carrollton, TX (US)

(72) Inventor: Jeffrey Lovett, Carrollton, TX (US)

( * ) Notice: Subject to any disclaimer, the term of this patent is extended or adjusted under 35 U.S.C. 154(b) by 0 days.

(21) Appl. No.: 14/694,700

(22) Filed: Apr. 23, 2015

(65) Prior Publication Data

US 2015/0225041 A1 Aug. 13, 2015

Related U.S. Application Data

(63) Continuation-in-part of application No. 14/045,229, filed on Oct. 3, 2013, now Pat. No. 9,028,288.

(51) Int. Cl.

| | | |
|---|---|---|
| *B63B 22/24* | (2006.01) | |
| *B63B 22/04* | (2006.01) | |
| *A45B 11/00* | (2006.01) | |
| *A45B 25/00* | (2006.01) | |
| *A43B 3/10* | (2006.01) | |
| *A43B 3/12* | (2006.01) | |
| *A43B 7/14* | (2006.01) | |
| *A43B 13/16* | (2006.01) | |
| *A43B 13/18* | (2006.01) | |
| *B29D 35/12* | (2010.01) | |

(52) U.S. Cl.
CPC .............. *B63B 22/24* (2013.01); *A43B 3/108* (2013.01); *A43B 3/128* (2013.01); *A43B 7/144* (2013.01); *A43B 7/1445* (2013.01); *A43B 13/16* (2013.01); *A43B 13/188* (2013.01); *A43B 13/189* (2013.01); *A45B 11/00* (2013.01); *A45B 25/00* (2013.01); *B29D 35/122* (2013.01); *B63B 22/04* (2013.01); *A45B 2025/003* (2013.01); *A45B 2200/1009* (2013.01)

(58) Field of Classification Search
CPC .......... A45B 3/00; A45B 5/00; A45B 11/00; A45B 25/00; B63B 22/00; B63B 22/04; B63B 22/24
USPC .......... 441/1, 13, 21, 22, 28, 29, 30, 32, 35, 441/38, 136; 135/16; 405/218, 219; 472/128
See application file for complete search history.

(56) References Cited

U.S. PATENT DOCUMENTS

| | | | | |
|---|---|---|---|---|
| 366,077 | A * | 7/1887 | Delany ................... | B63B 22/00 43/43.14 |
| 3,875,602 | A * | 4/1975 | Miron ....................... | F21K 2/06 441/13 |
| 6,139,382 | A * | 10/2000 | Eschbacher ............. | B63B 22/24 441/32 |

\* cited by examiner

*Primary Examiner* — Lars A Olson
(74) *Attorney, Agent, or Firm* — Howison & Arnott, LLP (57) ABSTRACT

A floating mounting base for supporting a vertical support in water includes a housing having an integrated top wall, bottom wall and side wall defining an enclosed, interior chamber for maintaining a weighting material below a surface of the water. The base housing further defining an opening in the top wall thereof and a vertical support receiver defined within the interior chamber for receiving and supporting the vertical support in the substantially vertical position. The housing further defines at least one opening to enable the weighting material to be placed within the enclosed, interior chamber.

20 Claims, 10 Drawing Sheets

FLOATING MOUNTING BASE FOR AN UMBRELLA

CROSS-REFERENCE TO RELATED APPLICATIONS

This application is a Continuation-in-Part of U.S. application Ser. No. 14/045,229, filed on Oct. 3, 2013, entitled FLOATING MOUNTING BASE FOR AN UMBRELLA, which claims priority to U.S. Provisional Application Ser. No. 61/762,926, filed on Feb. 10, 2013, entitled A FLOATING SHADE BASE FOR AN UMBRELLA, the specifications of which are incorporated herein by reference in their entirety.

TECHNICAL FIELD

The present invention relates to umbrella and pole bases, and more particularly to a floating umbrella or pole base.

BACKGROUND

Umbrella, sign or flag bases have long been known and are widely used. The bases are configured to receive a pole or staff and to maintain the pole or staff in a vertical position. The majority of existing umbrella, sign or flag bases have been configured for use on land. However, due to the widespread use of pools, lakes, oceans or other types of water activities, there has arisen a need for an umbrella, sign or flag base that will support an umbrella, sign or flag pole or staff, while at the same time providing a floating base. The floating base must be stable while maintaining the umbrella, sign or flag pole or staff in an upright, vertical position.

SUMMARY

The present invention, as disclosed and described herein, in one aspect thereof, comprises floating mounting base for supporting a vertical support in water includes a housing having an integrated top wall, bottom wall and side wall defining an enclosed, interior chamber for maintaining a weighting material below a surface of the water. The base housing further defining an opening in the top wall thereof and a vertical support receiver defined within the interior chamber for receiving and supporting the vertical support in the substantially vertical position. The housing further defines at least one opening to enable the weighting material to be placed within the enclosed, interior chamber.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of the floating shade base for an umbrella are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
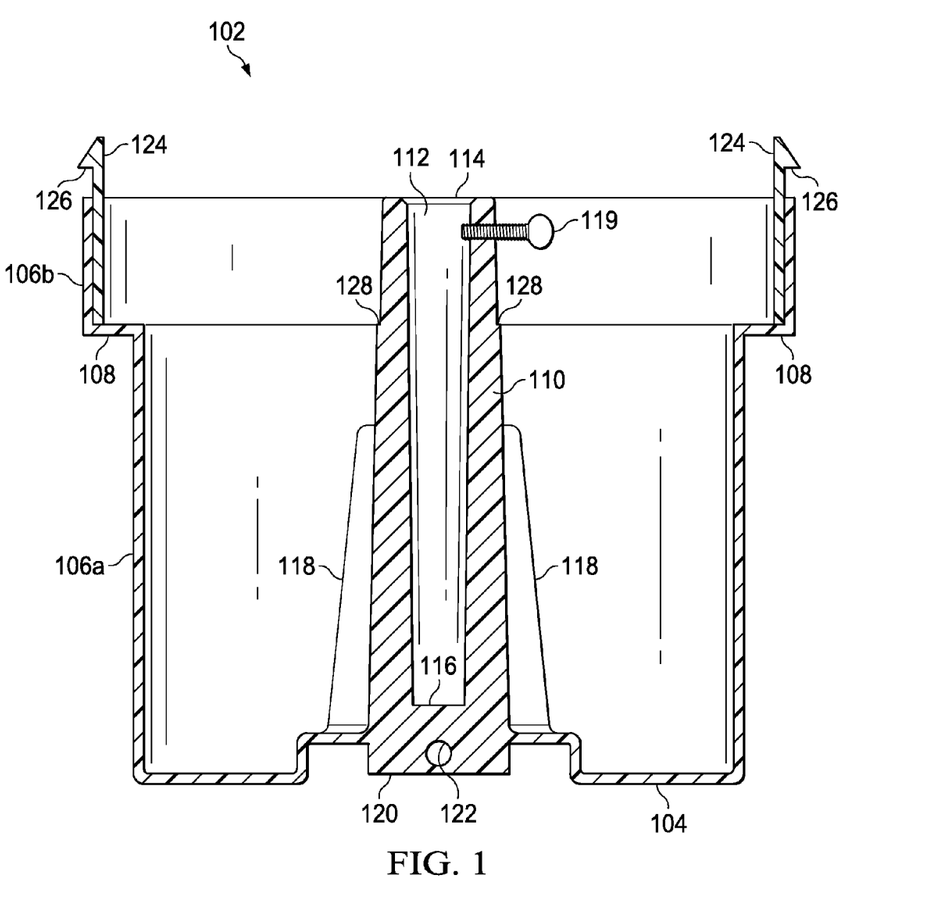
FIG. 1 is a cross-sectional view of the base housing.
Figure 2:
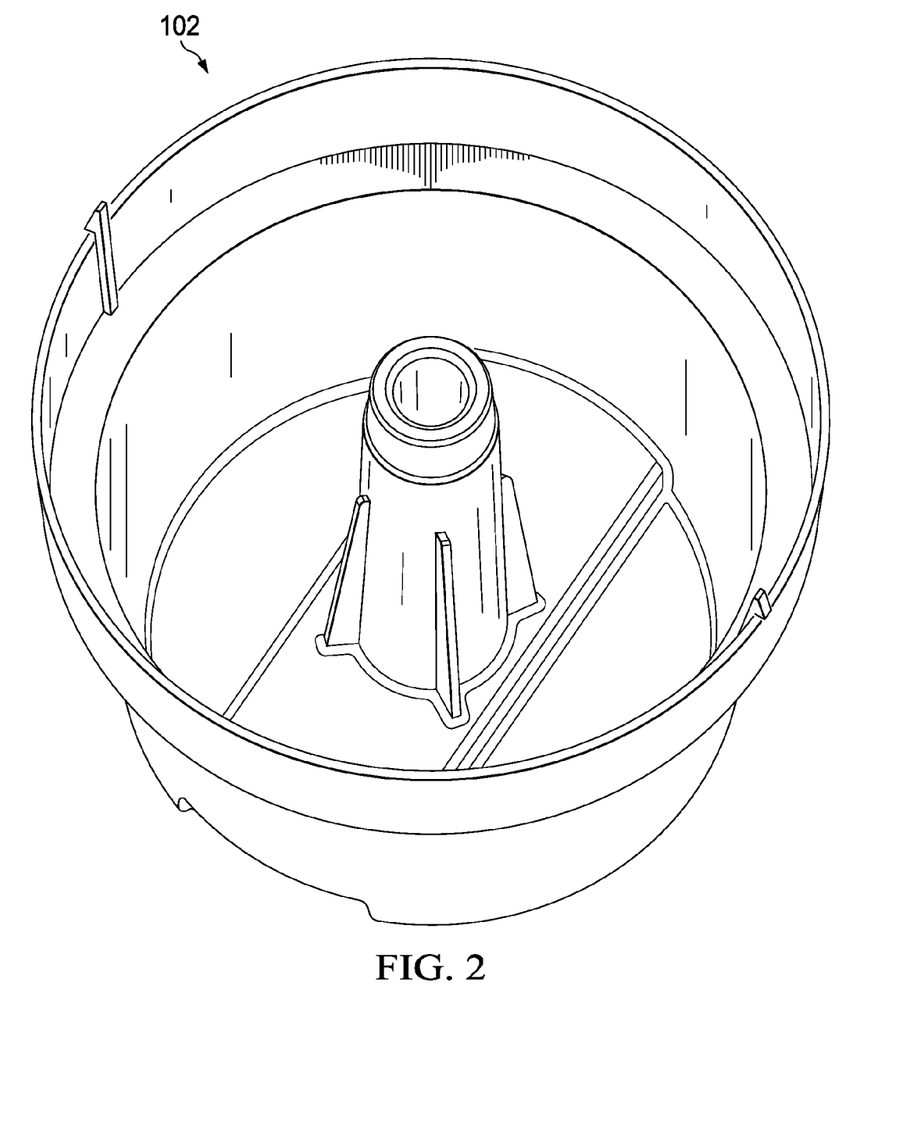
FIG. 2 is a perspective view of the base housing.

Referring now to the drawings, and more particularly to FIGS. 1 and 2, there are illustrated a cross-sectional view of a base housing 102 and a perspective view of the base housing 102. The base housing 102 provides stability by differentiating water used as weight, from water in which the base housing is floating. The base housing 102 provides the primary resistance to external forces that would cause tipping or otherwise non-vertical support of the umbrella staff 604. The base housing 102 includes a circular bottom 104. From the edges of the circular bottom 104 rises a housing wall 106. The housing wall 106 has a same diameter as the exterior edges of the circular bottom 104 on a lower portion 106*a* of the housing wall 106. An upper portion 106*b* of the housing wall 106 has a greater diameter than the lower portion 106*a* of the housing wall 106. The upper portion 106*b* and lower portion 106*a* of the exterior wall 106 are interconnected via a ledge 108. The housing wall 106*a* and 106*b* diameter may be inverted from this if materials allow for it. Thus, the taper will be in either a tapered configuration that increases or decreases when going from the bottom 104 to the top edges. The configuration with the larger bottom 104 provides more stability.

Rising from the circular bottom 104 of the base housing 102 is a pole support pillar 110. The pole support pillar 110 is a conically shaped housing rising from the circular bottom 104. The pole support pillar 110 has a larger diameter at its base next to the circular bottom 104 than at its upper end 112. The pole support pillar 110 additionally defines a bore 112 for receiving an umbrella pole, flagpole or sign pole. The bore 112 has a larger diameter at its open end 114 than it does at its terminating end. This is to enable differing size poles to be securely affixed within the bore 112. A pole that initially fits within the bore 112 will eventually come into contact and be secured by the sides of the bore 112 as it travels towards the terminating end 116. Providing additional support to the pole support pillar 110 are various support vanes 118 providing vertical support between the circular base 104 and the sides of the pole support pillar 110. A thumb screw 119 (or other securing device) threaded through support pillar 110 keeps the umbrella from rising out of base housing 102.

An anchoring tab 120 is a rectangular shaped tab that extends below the circular bottom 104 and defines an opening 122 therein. The anchoring tab 120 allows a rope or cable to be connected to the opening 122 and an anchor or other tie down attached to the base housing 102 to keep it from floating around and in a tethered position.

The base housing 102 additionally defines a number of securing tabs 124 along a top edge of the upper surface 106*b* of the exterior wall 106. The securing tabs 124 are configured to flex in a first direction and secure a lid to the base housing as will be described more fully herein below. In the present configuration, the securing tabs 124 define a latching ledge 126 that secures a lid to the top opening of the base housing 102.

Figure 3:
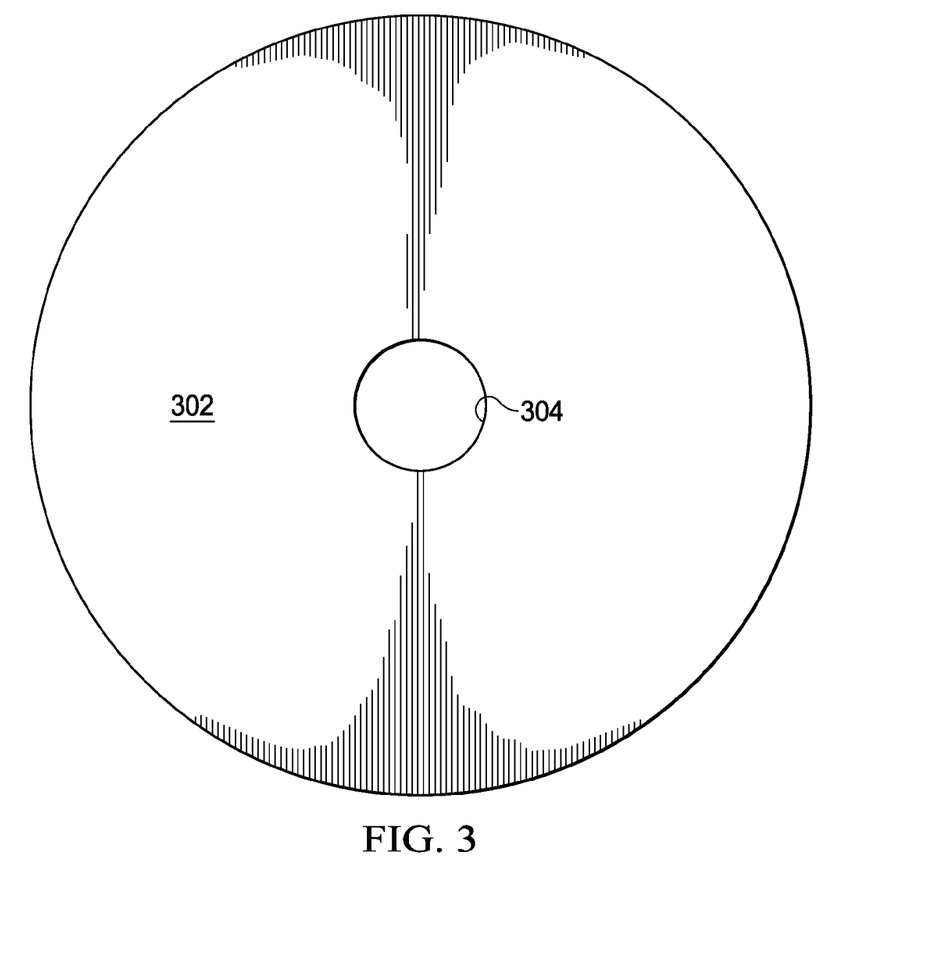
FIG. 3 is a top view of the base gasket.

Referring now also to FIG. 3, there is illustrated a housing gasket 302. The housing gasket 302 is used to prevent sand or other items from escaping base housing 102. The housing gasket 302 may comprise a rubber or other type of sealing material in the shape of an annular ring. An opening 304 within the interior of the gasket ring 302 goes over the upper portion of the pole support pillar 110. The bottom side of the gasket side 302 then rests on the housing wall ledge 108 defined within the housing wall 106 and a pole support pillar ledge 128 defined within the outer surface of the pole support pillar 110. In this manner, the housing gasket 302 will rest in the upper portion of the base housing 102 and prevent sand and other unwanted materials from escaping base housing 102 defined by the lower portion 106a of the housing wall 106.

Figure 4:
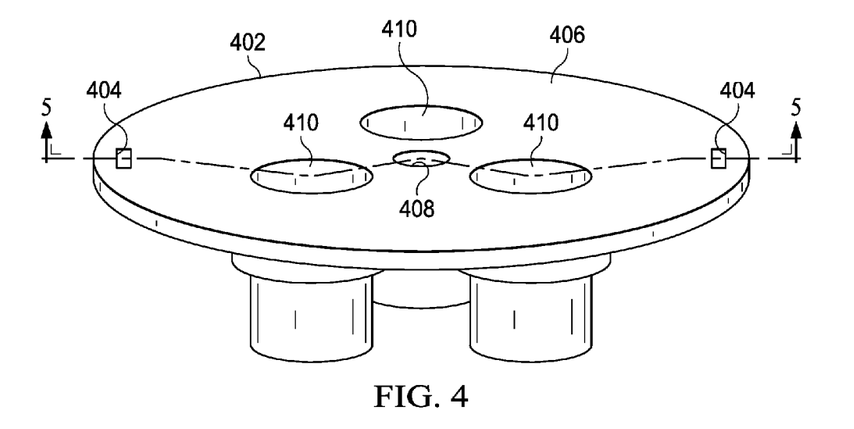
FIG. 4 is a perspective view of the base housing lid.
Figure 5:
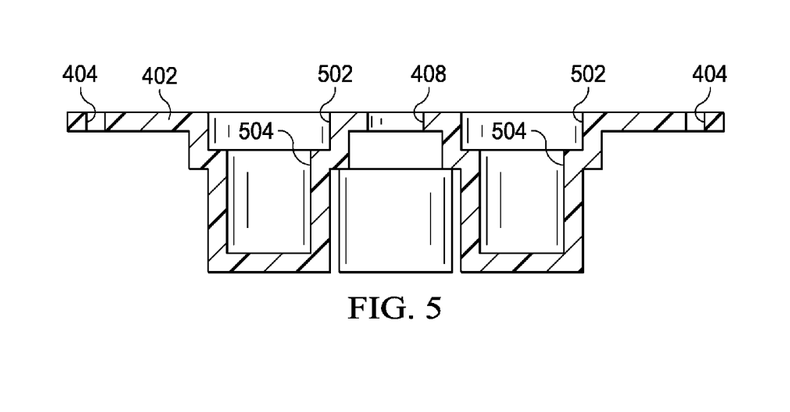
FIG. 5 is a cross-sectional view of the base housing lid.

Referring now to FIGS. 4 and 5 there are illustrated a perspective view of the base housing lid 402 and a cross sectional view of the base housing lid 402. The base housing lid 402 comprises a substantially circular disc that cover the open end of the base housing 102. The base housing lid 402 when placed on the base housing 102 prevents water and other materials from entering into the interior of the base housing. The base housing lid 402 defines therein openings 404 for receiving the securing tabs 124 defined with on the upper portion 106b of the exterior wall 106 of the base housing 102. When the securing tabs 124 slide within the openings 404, the latching ledge 126 will engage a top surface 406 of the base housing lid 402 and secure the base housing lid 402 in place. The base housing lid 402 further defines an opening 408 for receiving an umbrella pole. The opening 408 is placed in such a manner to line up with the opening 114 of the pole support pillar 110 within the base housing 102.

The base housing lid 402 additionally defines a number of cup holders 410. The cup holders 410 are defined by a larger upper ring portion 502 and a lower smaller diameter ring portion 504. This will enable cups of differing size to be placed in either the upper ring 502 or lower ring 504, or alternatively, enable a user to grasp the top of a container held within the lower ring 504. Lower ring 504 also presses against gasket 302 to provide a seal and secure it in place.

The base housing lid 402 and base housing 102 may be constructed entirely of common plastic injection molded raw materials such as nylon, polyethylene, polyvinylchloride or polypropylene but is not limited to these materials. In a further embodiment, the lower portion 106a of the housing wall 106 and the pole housing 110 may additionally be constructed of a watertight flexible material. This will enable these portions of the base housing 102 to be collapsed into a transportable configuration.

Figure 6:
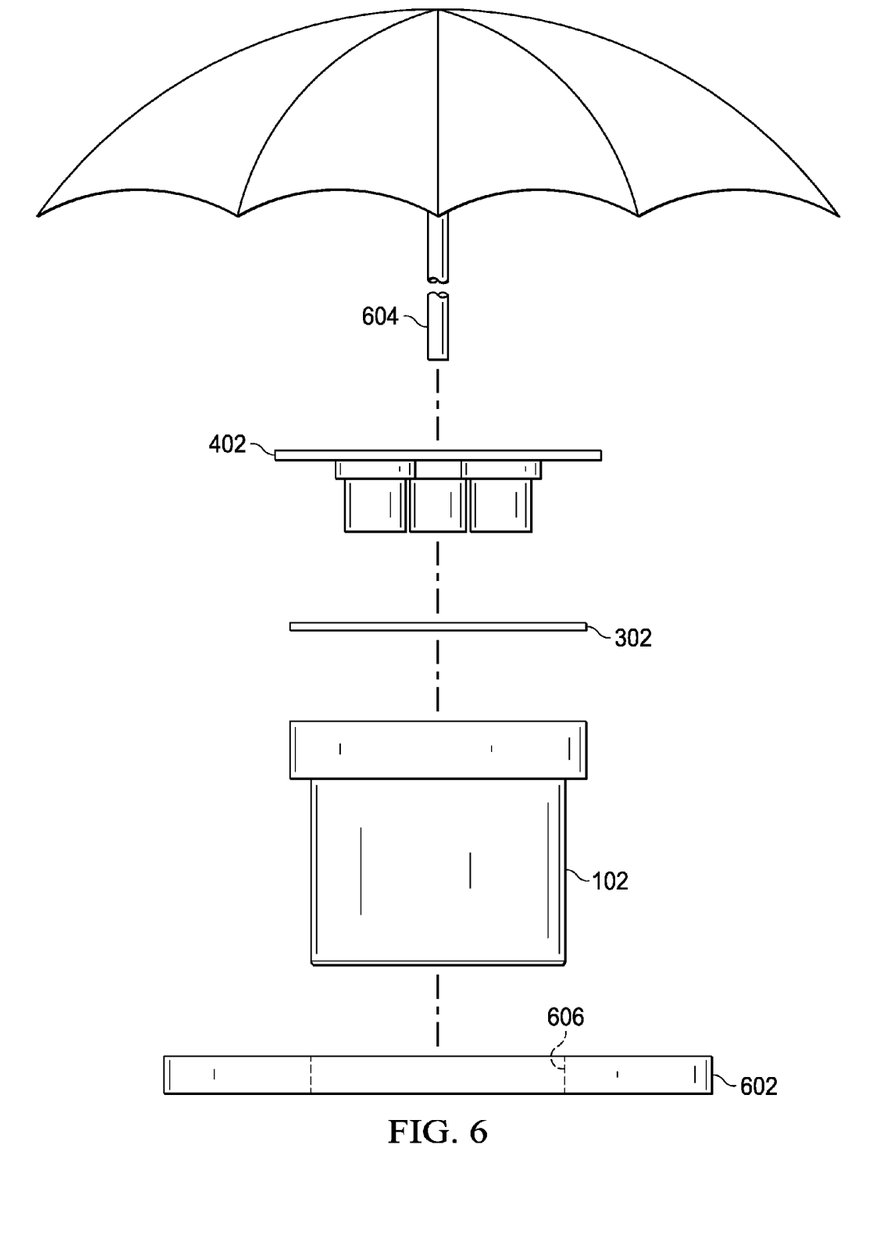
FIG. 6 is a side view illustrating the interconnection of the base housing, base gasket, base lid, a float and an umbrella.

Referring now to FIG. 6, there is illustrated the manner in which the base housing 102, housing lid 402 and housing gasket 302 are inter-connected with a float 602 and flagpole 604 in order to utilize the floating housing in a preferred manner. The housing gasket 302 is inserted within the base housing 102 to rest on the ledges 108 and 128 as described previously herein. Before the gasket 302 is placed, water, sand, gravel or some other type of weighting material may be added within the bottom portion of the base housing 102 in order to counteract the weight of an umbrella or other pole. The weighting material is thus maintained below the surface of the water within the base housing 102. Once the housing gasket 302 and any weighting material are placed within the base housing 102, the housing lid 402 is placed upon the top of the base housing 102 and secured in place via the securing tabs 124. Some type of ring float 602 may be placed around the base housing 102. The ring float 602 may comprise a life-saving ring or inflatable ring type float to provide buoyancy to the base housing 102. The only requirement with respect to the ring float 602 is that the inner ring opening 606 be of sufficient size to fit around the base housing 102 yet not too large to exceed the edges of the base housing lid 402. Thus, the buoyancy of the ring float 602 will force the ring float upward until it comes in contact with the base lid 402 or the upper portion 106b of the exterior wall 106. The umbrella staff 604 is inserted into the opening in the base lid 402 and into the pole support pillar 110 within the interior of the base housing 102. In this manner the umbrella and umbrella staff 604 are held in an upright position that floats upon the water.

Figure 7:
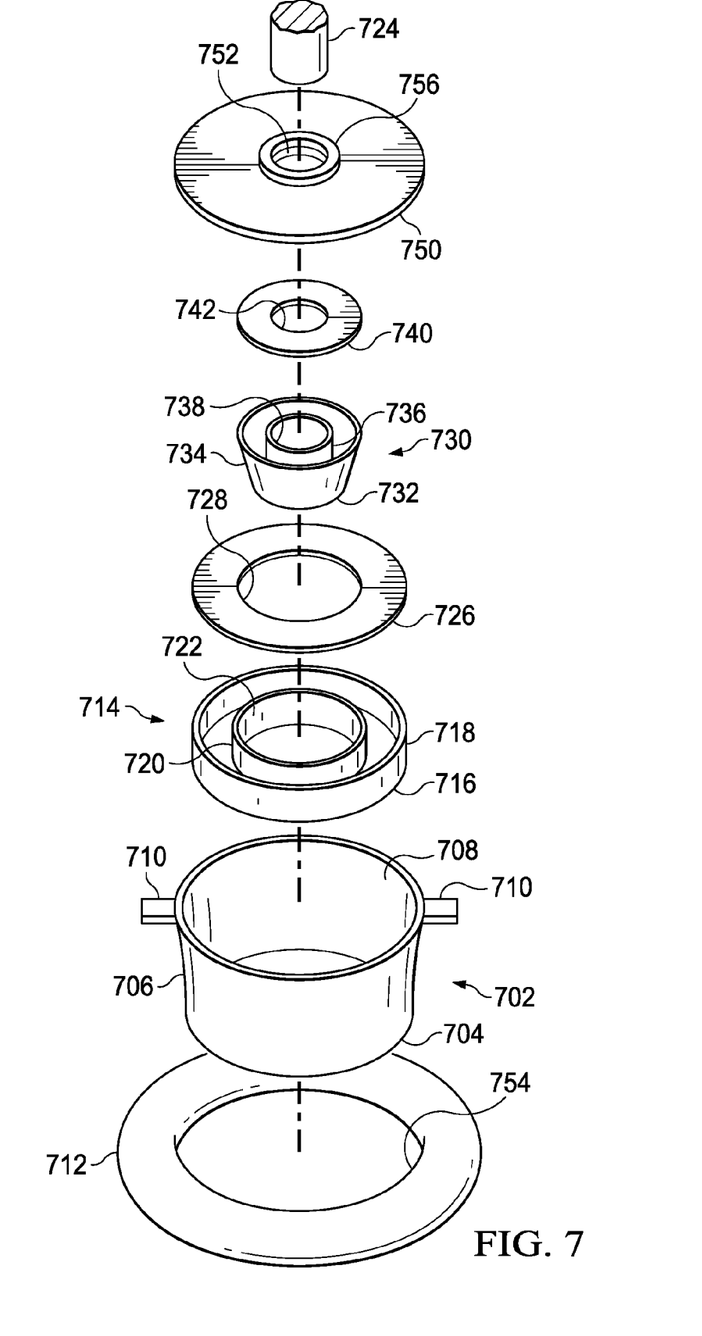
FIG. 7 is a perspective view of a further embodiment of an umbrella base float.

Referring now to FIG. 7, there is illustrated an alternative embodiment of the floating mounting base. In this embodiment, the floating mount includes a base container 702. The base container 702 include a bottom portion 704 having a side wall 706 extending upward from the edges thereof defining an interior area for containing weighting material and maintaining it below the surface of the water. The side wall 706 defines an opening 708 for providing access to the interior of the base container 702. The base container 702 further comprises a pair of handles 710 for carrying the floating mounting base and securing a float ring 712 thereto. Alternative to the handle 710, a curved lip or edge may be defined upon the housing container 702 or on the lid 750 in order to support the floatation ring 712.

A base insert cylinder 714 provides a container for holding sand, water, gravel or other weighted material that may be placed inside the base container 702. The base insert cylinder 714 includes a base bottom 716 connected to a base outer wall 718 that extends from the periphery of the base bottom 716. Also extending from the base bottom 716 is a base inner wall 720 that forms a cylinder including a central aperture 722 defining an opening for receiving a pole insert 730 as will be described below. The base insert cylinder 714 additionally includes an annular lid 726 that covers the base insert cylinder 714 to enclose the weighting material placed therein. Annular lid 726 may be disc shaped and include a central aperture 728 to receive the pole insert 730. The annular lid 726 may threadedly engage the base insert cylinder 714 or be interconnected therewith via some other type of latching, locking or securing mechanism.

The opening defined within the base insert cylinder 714 is for receiving the pole insert 730. The pole insert 730 includes a pole insert bottom 732 and a pole insert side wall 734 extending from the periphery of the pole insert bottom 732. A pole insert inner side wall 736 also extends from the bottom of the pole insert bottom 732 and includes a central aperture 738 that extends through the pole insert bottom 732 to enable a pole 724 to extend through the pole insert 730. A pole insert lid 740 comprises an annular ring defining an aperture 742 therein for aligning with the aperture 738 of the pole insert inner side wall 736. The pole insert lid 740 may threadedly engage the pole insert side wall 734 or be secured thereto by some type of latch, locking or other securing mechanism. The pole insert 730 is placed within the aperture 728 and 722 defined within the base insert cylinder 714. The aperture 738 defined within the pole insert 730 then receives the umbrella, sign or flag pole 724.

Finally, the entire mechanism is sealed using a bucket base lid 750. The bucket base lid 750 comprises a disc that defines an opening 752 therein for receiving a staff or flagpole 724. The bucket base lid 750 threadedly engages the side wall 706 of the bucket container housing 702 or alternatively may be secured thereto via a latch, locking mechanism or other type of securing mechanism.

A floatation ring 712 may comprise an inflatable or non-inflatable donut shaped device defining an opening 754 therein for going around the container housing 702. The buoyancy of the floatation ring 712 will then force it upward against the handles 710 of the container housing 702. The floatation ring 712 may comprise a foam or other type of floatation material, or alternatively, may comprise an inflatable ring that may be more easily transported by a user. The float 712 is detachably connected to the container housing 702 to provide resistance for the weight of the container 702 and a mounted pole 724. The floatation ring 712 may be deflated in travel mode but can also be inflated via oral ports or valve stems using a pump. The float 712 may be a standard "pool float" or "inner tube" design. The float 712 could also be encased within a mesh netting to provide added strength and container support.

The opening 752 within the lid 750 may also include some type of locking mechanism 756 for securing the pole 724 inserted therein. The locking mechanism 756 may comprise a compression fitting of correct size to allow for the manual tightening and loosening to secure the pole 724 inserted into the floating base. A compression fitting is a leak-resistant pipe joint designed for a tight filling sleeve that exerts a large inward pressure on the exterior of the pipe. The compression fitting would be sized according to the requirement of the umbrella or flag being supported.

Figure 8:
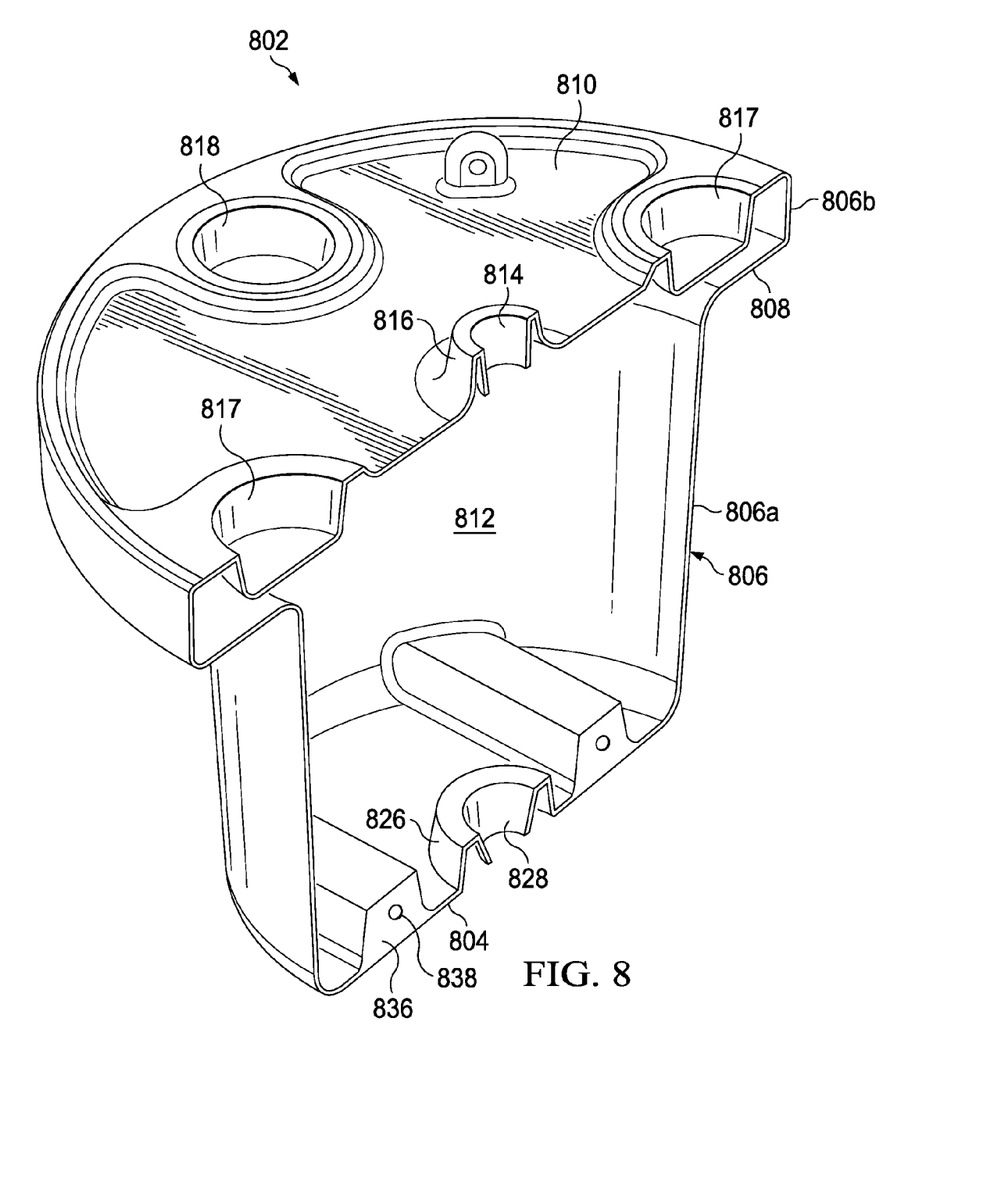
FIG. 8 is a perspective cross-sectional view of a alternative embodiment of an umbrella base float.
Figure 9:
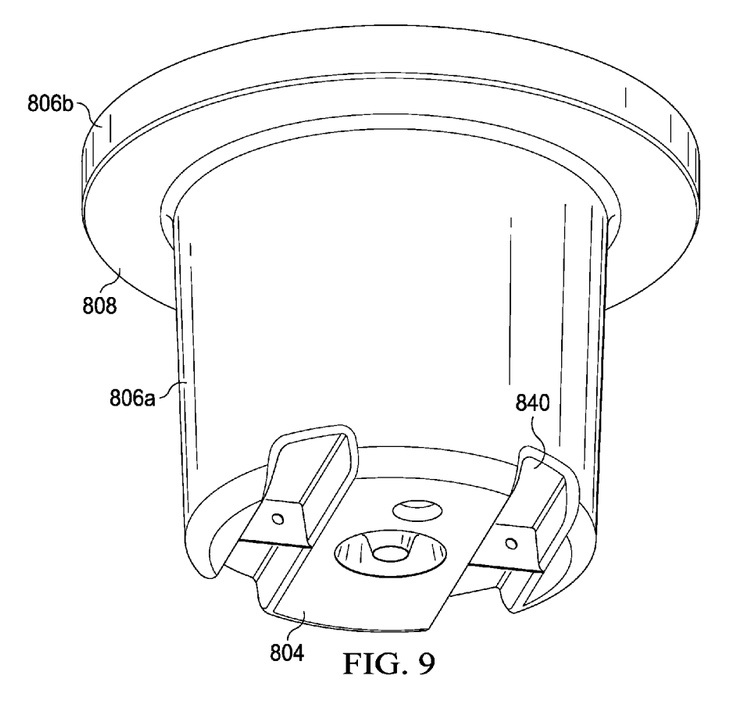
FIG. 9 is a perspective view of a bottom portion of the alternative embodiment of FIG. 8.
Figure 10:
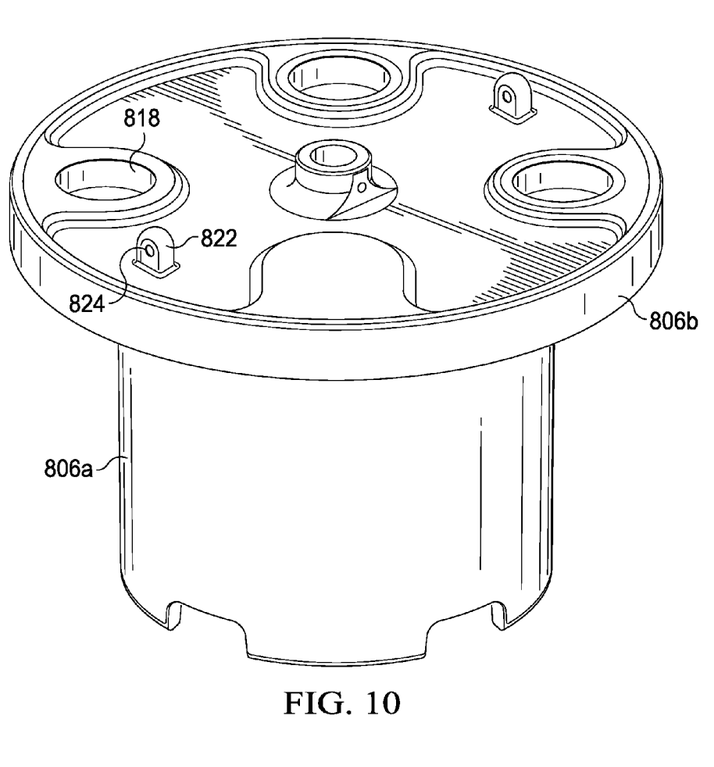
FIG. 10 is a perspective view of a top portion of the alternative embodiment of FIG. 8.

Referring now to FIGS. 8-10, there is illustrated an alternative embodiment of the floating mounting base. FIG. 8 illustrates a cross-sectional view of the floating base. FIGS. 9-10 illustrate bottom and top perspective views, respectively. The alternative embodiment of the mounting base 802 includes a bottom wall 804, extending between sidewall 806. The sidewall 806 includes a bottom portion 806A and a top portion 806B, wherein the top portion 806B has a larger diameter than the bottom portion 806A forming a circular wall extending from bottom wall 804. The top portion 806B and the bottom portion 806A are interconnected via a ledge 808.

Enclosing the top portion of the mounting base 802 is a top wall 810 extending between the top edges of the top portion 806B of the sidewalls 806. The top wall 810, sidewalls 806 and bottom wall 804 comprise continuous, integrated components that define a completely enclosed interior chamber 812 within the mounting base 802. The interior chamber 812 is for holding water, sand or other ballast material to prevent the mounting base 802 from tipping over when a support pole is inserted therein. The interior chamber 812 may also be used to hold ice and beverages. A collapsible insulating material may be inserted through opening 818 and placed around sidewalls 806a and 804 for use as a limited cooler.

The top wall 810 defines a pole opening 814 into which a support pole may be inserted. An annular collar 816 rises upward from the opening 814 to provide further support for the umbrella pole. The annular collar 816 further includes a ¼ inch threaded hole for securing an inserted pole with a ¼ inch screw. The top wall 810 further defines at least one cup holder 817 into which a bottle or can may be placed while the mounting base 802 is floating in the water. The top wall 810 will further define at least one opening 818 providing access to the interior chamber 812. The opening 818 may be used for inserting water, sand or other ballast material into the interior chamber 812 to assist the mounting base 802 in remaining in an upright position when an umbrella is placed within the mounting base 802. The opening 818 may be sized to act as a cup holder. A plug or lid 820 may be inserted into the opening 818 to prevent material from leaving the interior chamber 812. The top wall 810 may further define one or more retaining tabs 822 defining an opening 824 therein which may be used for securing the mounting base 810 in a fixed position when floating on the water.

The bottom wall 804 includes a bottom collar 826 defining an opening 828 for receiving the bottom portion of a support umbrella pole. The opening 828 defines a conical interior wherein the diameter of the opening decreases from the beginning of the opening end to the terminating end of the opening within the bottom collar 826. This enables differing size poles to be inserted within and securely fixed within the opening 828. A pole that initially fits within the opening 828 will eventually come into contact and be secured by the sides of the opening 828 as the pole travel towards the terminating end of the opening 828. The bottom wall 804 also defines a pair of channels 834 provide two anchor holes for further stabilizing the base if needed or to hold the base in position from the bottom. The bottom wall 804 further defines a pair of retaining tabs 836 each having a hole 838 defined therein. The mounting base 802 may be secured to a fixed location using these retaining tabs 836 when the mounting base 802 is floating in water.

The bottom wall 804 further defines at least one opening 840. The opening 840 may be used for allowing water to enter into the interior chamber 812 when the mounting base 802 is placed within the water. When the mounting base 802 is within the water, the top wall 810 may be pressed down on one side causing the bottom wall 804 to tilt and allow air trapped within the interior chamber 812 to escape and allow water to flow into the interior chamber through the opening 840. Once the desired amount of water has entered the interior chamber 812, a plug 842 may be placed within the opening 840 in order to trap the water within the interior chamber 812, when the mounting base 802 returns to an upright position. In a similar manner, water may be inserted into the interior chamber 812 through the opening 818 defined within the top wall 810 while the plug 842 is placed within the opening 840 within the bottom wall 804. The interior chamber 812 may then be filled through the top opening 818 to a desired water level.

Once water has been filled to a desired level within the interior chamber 812, a support umbrella pole or other vertical support member may be inserted through the top opening 814 into the bottom collar opening 828. The support umbrella pole and associated umbrella will then be held in an upright position by the mounting base 802.

In a similar manner, as in previously described embodiments, a float (not shown) may be placed around the bottom portion 806A of the sidewall 806 and rest against the ledge 808. The float will then cause the mounting base 802 to float within the water as the float will support the mounting base in the water by resting against the ledge 808.

As described with respect to the previous embodiment the components may be formed in a number of fashions including common injection molded or rotational molded plastics such as polyethylene, polyvinylchloride and polypropylene but can be made of other flexible materials or components if desired.

Figure 11:
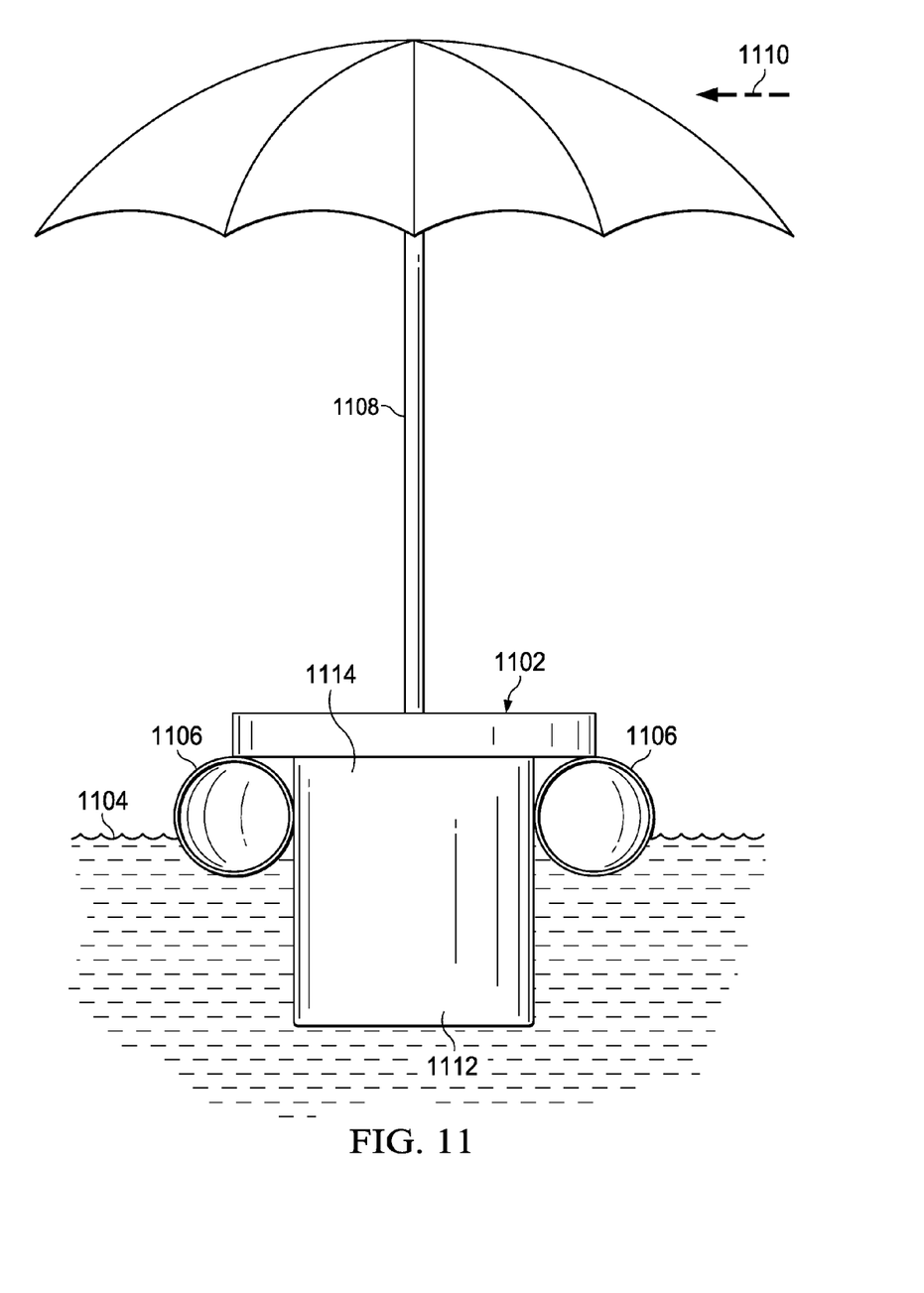
FIG. 11 illustrates the stability characteristics provided by the disclosed embodiments.

Referring now to FIG. 11, there is more particularly illustrated the stability characteristics provided by each of the embodiments illustrated in FIGS. 1 and 10. FIG. 11 generally illustrates a container 1102 comprising one of the previously discussed embodiments that is supported above the water level 1104 using a float 1106 that is shown in cross-section. Within the container 1102 is an umbrella 1108 that is acted upon by forces of the wind 1110. The interior of the container is divided into a first section 1112 comprising the lower portion of the container 1102, and a second section 1114 above the first section comprising the upper portion of the container 1102.

When floating in the water the container 1102 and a umbrella 1108 have a number of forces acting thereon. The float 1106 provides lift and tilt to the container based upon its buoyancy with respect to the water 1104. Similarly, the wind 1110 provides lateral forces that tend to tilt the umbrella 1108 and container 1102. Materials within the container 1102 act to counteract these forces. The first section 1112 contains a material of greater density than the surrounding media of water 1104, for example rocks or sand. This produces a weight based on a difference in density and the force of gravity. The weight created in the first section 1112 increases as it moves from water to air. Therefore as the forces of the wind 1110 act to lift or tilt the container 1102, the wind is counteracted as the additional weight provided by the material in the first section 1112 rises out of the water 1104. This enables the container 1102 and float 1106 two act together to stabilize against the forces of the wind 1110.

The second section 1114 may contain water which is readily available. Water within the second section 1114 also provides additional weight to stabilize the container 1102 since water has a higher density than air.

Within the above-described configuration a 3 foot diameter container 1102 may support a 9 foot umbrella 1108 using only the weight of water within the container. The first section 1112 can be filled with a more dense material to increase stability of the container 1102 as needed. When completely emptied for transportation by pouring out the water and denser material the container can have a total travel weight of approximately 7 pounds.

Thus, using the above-described configurations a staff or pole of an umbrella, flag or sign may be floatably supported within the water in a useful fashion. It will be appreciated by those skilled in the art having the benefit of this disclosure that this floating shade base for an umbrella provides a water based float for supporting an umbrella, flag, sign staff or pole. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A floating mounting base for supporting a vertical support in water, comprising:
   a housing having an integrated top wall, bottom wall and side wall defining an enclosed, interior chamber for maintaining a weighting material below a surface of the water, the housing further defining a opening in the top wall thereof and a vertical support receiver defined within the interior chamber for receiving and supporting the vertical support in a substantially vertical position;
   wherein the sidewall further comprises a first portion having a first size and a second portion having a second size that is larger than the first size, the first portion and the second portion interconnected via a ledge; and
   wherein the housing further defines at least one opening to enable the weighting material to be placed within the enclosed, interior chamber.

2. The floating mounting base of claim 1, wherein the sidewall further comprises the first portion having a first diameter and the second portion having a second diameter that is larger than the first diameter, the first portion and the second portion interconnected via the ledge.

3. The floating mounting base of claim 2, wherein a bottom of the housing is insertable within an opening of a float and engages the float at the ledge to prevent the second portion of the housing from passing through the opening of the float.

4. The floating mounting base of claim 1, wherein the vertical support receiver further comprises a conically shaped chamber having a larger diameter at an open end thereof and a smaller diameter at a terminating end thereof.

5. The floating mounting base of claim 1, wherein the housing further defines an opening in the top wall of the housing and a second opening in the bottom wall of the housing.

6. The floating mounting base of claim 1 further including at least one plug for placement in the at least one opening to maintain the weighting material within the interior chamber.

7. The floating mounting base of claim 1, wherein the top wall of the housing further defines at least one cup holder therein.

8. The floating base of claim 1, wherein the at least one opening further comprises a cup holder.

9. A floating mounting base for supporting a vertical support in water, comprising:
   a circular housing having an integrated top wall, bottom wall and side wall defining an enclosed, interior chamber for maintaining a weighting material below a surface of the water, the circular housing further defining an opening in the top wall thereof and a vertical support receiver defined within the interior chamber for receiving and supporting the vertical support in a substantially vertical position; and
   wherein the circular housing further defines at least one opening in the top wall of the housing and a second opening in the bottom wall of the housing to enable the weighting material to be placed within the enclosed interior chamber, the at least one opening in the top wall of the housing further comprises a cup holder.

10. The floating mounting base of claim 9, wherein the sidewall further comprises a first portion having a first diameter and a second portion having a second diameter that is larger than the first diameter, the first portion and the second portion interconnected via a ledge.

11. The floating mounting base of claim 10, wherein a bottom of the circular housing is insertable within an opening of a float and engages the float at the ledge to prevent the second portion of the housing from passing through the opening of the float.

12. The floating mounting base of claim 9, wherein the vertical support receiver further comprises a conically shaped chamber having a larger diameter at an open end thereof and a smaller diameter at a terminating end thereof.

13. The floating mounting base of claim 9 further including at least one plug for placement in the at least one opening to maintain the weighting material within the interior chamber.

14. The floating mounting base of claim 9, wherein the top wall of the circular housing further defines at least one further cup holder therein.

15. The floating mounting base of claim 9, wherein the base housing further defines an anchor point on an exterior surface of the circular housing for securing the floating mounting base to a fixed position.

16. A floating mounting base for supporting a vertical support in water, comprising:
- a circular housing having an integrated top wall, bottom wall and side wall defining an enclosed interior chamber for maintaining a weighting material below a surface of the water, the sidewall further comprises a first portion having a first diameter and a second portion having a second diameter that is larger than the first diameter, the first portion and the second portion interconnected via a ledge, the circular housing further defining an opening in the top wall thereof and a vertical support receiver defined within the interior chamber for receiving and supporting the vertical support in a substantially vertical position;
- wherein a bottom of the housing is insertable within an opening of a float and engages the float at the ledge to prevent the second portion of the housing from passing through the opening of the float; and
- wherein the housing further defines at least one opening in the top wall of the housing and a second opening in the bottom wall of the housing to enable the weighting material to be placed within the enclosed interior chamber, the at least one opening in the top wall of the housing further comprises a cup holder.

17. The floating mounting base of claim 16, wherein the vertical support receiver further comprises a conically shaped chamber having a larger diameter at an open end thereof and a smaller diameter at a terminating end thereof.

18. The floating mounting base of claim 16 further including at least one plug for placement in the at least one opening to maintain the weighting material within the interior chamber.

19. The floating mounting base of claim 16, wherein the top wall of the circular housing further defines at least one further cup holder therein.

20. The floating mounting base of claim 1, wherein the housing further defines an anchor point on an exterior surface of the housing for securing the floating mounting base to a fixed position.

\* \* \* \* \*